United States Patent
Fujii et al.

(10) Patent No.: US 9,732,737 B2
(45) Date of Patent: Aug. 15, 2017

(54) DRIVE UNIT AND MOUNTING STRUCTURE THEREOF

(71) Applicant: SMK Corporation, Tokyo (JP)

(72) Inventors: Katsuhito Fujii, Tokyo (JP); Takeshi Matsuda, Kanagawa (JP); Yoshinori Watanabe, Kanagawa (JP); Yuki Akita, Kanagawa (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 14/961,890

(22) Filed: Dec. 8, 2015

(65) Prior Publication Data
US 2016/0102656 A1    Apr. 14, 2016

(30) Foreign Application Priority Data

Oct. 10, 2014  (JP) ................................. 2014-208762

(51) Int. Cl.
    *F03G 7/06*     (2006.01)
    *F16M 13/02*    (2006.01)
    *H02N 10/00*    (2006.01)

(52) U.S. Cl.
    CPC ............. *F03G 7/065* (2013.01); *F16M 13/02* (2013.01); *H02N 10/00* (2013.01)

(58) Field of Classification Search
    CPC .......... F03G 7/065; F16M 13/02; H02N 10/00
    USPC .................................. 310/306, 307
    See application file for complete search history.

(56) References Cited

U.S. PATENT DOCUMENTS

| | | | |
|---|---|---|---|
| 6,837,755 B1 | 1/2005 | Kitajima et al. | |
| 2004/0261411 A1* | 12/2004 | MacGregor | F03G 7/065 60/527 |
| 2013/0145760 A1* | 6/2013 | Gondo | F03G 7/065 60/528 |
| 2014/0327764 A1* | 11/2014 | Nelson | H04N 5/2252 348/143 |

FOREIGN PATENT DOCUMENTS

| | | |
|---|---|---|
| JP | 2005-226456 A | 8/2005 |
| JP | 2006-134991 A | 5/2006 |
| JP | 2008-211863 A | 9/2008 |
| JP | 2014-037806 A | 2/2014 |

(Continued)

OTHER PUBLICATIONS

Office Action issued for counterpart Japanese Application 2014-208762, issued by Japan Patent Office on Jul. 20, 2016.

(Continued)

*Primary Examiner* — Terrance Kenerly

(57) ABSTRACT

A drive unit includes a base member having an operation base having operation recesses in a front surface, a movable member that is disposed to be opposite to the base member and has operation projections to be inserted into the operation recesses in an opposed surface, and a shape memory alloy member that is disposed between the base member and the movable member and shrinks by heat generated by passing an electric current. In conjunction with the shrinkage of the shape memory alloy member by the passage of the electric current, the movable member is moved in a direction away from the base member. The base member has a fixed portion in its middle in a core axial direction of the shape memory alloy member, to fix the middle on a support member.

12 Claims, 10 Drawing Sheets

(56) References Cited

FOREIGN PATENT DOCUMENTS

| | | |
|---|---|---|
| JP | 2014-37806 A | 2/2014 |
| JP | 2014-55527 A | 3/2014 |
| JP | 2014-88811 A | 5/2014 |
| JP | 2014-88818 A | 5/2014 |

OTHER PUBLICATIONS

International Search Report for International Application No. PCT/JP2015/061647, issued by the Japan Patent Office on Jul. 21, 2015.

* cited by examiner

DRIVE UNIT AND MOUNTING STRUCTURE THEREOF

CROSS REFERENCE TO RELATED APPLICATION

The contents of the following Japanese patent application and International patent application are incorporated herein by reference, Japanese Patent Application No. 2014-208762 filed on Oct. 10, 2014, and International Patent Application No. PCT/JP2015/61647 filed on Apr. 9, 2015.

FIELD

The present invention relates to a drive unit that is mainly used as an actuator for generating vibration and the like by taking advantage of a shape memory alloy, and a mounting structure thereof.

BACKGROUND

Conventionally, there are known drive units driven by taking advantage of the properties of a shape memory alloy, that is, the properties in which the shape memory alloy shrinks by heat of a certain temperature (operation temperature) or higher generated by passing an electric current therethrough even after being deformed by force (for example, refer to Patent Literature 1).

This drive unit is provided with an insulating base member having an operation base having one or more operation recesses in its top surface, and a movable member that is opposite to the base member and has operation projections to be inserted into the operation recesses in its opposed surface. A shape memory alloy material, which shrinks by heat generated by passing an electric current therethrough, is disposed between the opposed surfaces in such a manner as to be curved by following the operation recesses of the base member. Both ends of the shape memory alloy material are connected to connection terminals fixed to the base member.

In this drive unit, the shape memory alloy wires shrink by super elasticity when heated to the certain temperature or higher by passing the electric current through the shape memory alloy wires, so that the shape memory alloy wires push the movable part relatively in a direction away from the base member. When lowering the temperature of the shape memory alloy wires to the certain level or lower by canceling the energized state thereof, the shape memory alloy wires return to their original positions, and thus each of the shape memory alloy wires returns to the curved shape (shape in a non-energized state).

In this drive unit, the base member is fixed to a support member that is composed of a mounting board, an electronic equipment case, or the like, and the movable member is allowed to be in contact with or fixed to a device to be driven such as the electronic equipment case, so that a driving force of the drive unit, which is supported by the support member, is transmitted to the device to be driven.

On the other hand, as for mounting of this type of drive units, in addition to a structure of mounting the connection terminals fixed to the base member on the mounting board by surface mounting, there is known a structure for mounting the drive unit on the support member such as the mounting board without using soldering in which, just as with mounting of a general electronic component, clip-shaped terminals, which are formed as with fuse clips by pressing a conductive metal plate, are used and fixed to desired positions of the support member such as the electronic equipment case and the pair of clips made of spring nippers catch the connection terminals fixed to the base member (for example, refer to Patent Literature 2).

As this type of structure for mounting the electronic component on the support member without using soldering, there is known another structure in which cantilever spring attachment claws are formed in the support member such as the electronic equipment case so as to face in an entire height direction of the electronic component, and the attachment claws are engaged with a top end edge of the electronic component to allow mounting with a single motion (for example, refer to Patent Literature 3).

CITATION LIST

Patent Literature

Patent Literature 1: Japanese Patent Application Laid-Open No. 2005-226456
Patent Literature 2: Japanese Patent Application Laid-Open No. 2005-100940
Patent Literature 3: Japanese Patent Application Laid-Open No. 2006-134991

SUMMARY

Technical Problem

However, the above-described conventional techniques for fixing the drive unit without using soldering do not rigidly fix the base member to the support member. Thus, the base member instantaneously floats from the support member in reaction during operation, and thereby a gap occurring between the base member and the support member is likely to cause a loss in the transmission of the driving force to the device to be driven.

In view of such conventional problems, an object of the present invention is to provide a drive unit that can be mounted without using soldering and prevent a transmission loss of a driving force, and a mounting structure thereof.

Solution to Problem

To solve the conventional problems described above and achieve the above-described object, a feature of a first aspect of the invention is a drive unit including: a base member having an operation base having one or more operation recesses in a front surface thereof; a movable member that is disposed to be opposite to the base member and has an operation projection to be inserted into the operation recess in an opposed surface thereof; and a string or strip of shape memory alloy member that is disposed between the base member and the movable member and shrinks by heat generated by passing an electric current. The drive unit is configured such that the movable member is moved in a direction away from the base member in conjunction with the shrinkage of the shape memory alloy member by the passage of the electric current, and that a fixed portion is provided in a middle of the base member in a core axial direction of the shape memory alloy member in order to fix the middle on a support member.

A feature of a second aspect of the invention is configured such that, in addition to the configuration of the first aspect, the fixed portion is provided with a step-like attachment engagement portion that is disposed in a middle side surface of the base member in the core axial direction of the shape memory alloy member and projected in a direction intersecting the core axial direction of the shape memory alloy member.

A feature of a third aspect of the invention is configured such that, in addition to the configuration of the second aspect, the base member includes a base member main body made of an insulating resin, a concave engagement recess that is open in the direction intersecting the core axial direction of the shape memory alloy member is provided in a middle side surface of the base member main body, and an inner bottom edge of the engagement recess constitutes the attachment engagement portion.

A feature of a fourth aspect of the invention is configured such that, in addition to the configuration of the second aspect or third aspect, the base member is provided with a bracket that is made of a conductive metal plate and has side panels for covering side surfaces of the base member, an engagement opening is formed through the side panel of the bracket, and an inner bottom edge of the engagement opening constitutes the attachment engagement portion.

A feature of a fifth aspect of the invention is a mounting structure of a drive unit for fixing the drive unit according to any one of the first aspect to the fourth aspect on the support member. The mounting structure of the drive unit is configured such that the support member includes a holder for containing the drive unit, the holder is provided with a fixing unit fixed to the fixed portion to each other, and the middle of the base member in the core axial direction of the shape memory alloy member is fixed to the support member.

A feature of a sixth aspect of the invention is configured such that, in addition to the configuration of the fifth aspect, the holder includes a side wall opposite to a side surface of the drive unit, and the side wall supports the fixing unit to be engaged with the attachment engagement portion.

A feature of a seventh aspect of the invention is configured such that, in addition to the configuration of the sixth aspect, the side wall is provided with an elastic portion that is supported at an end thereof in the core axial direction of the shape memory alloy member and elastically deformable in a wall thickness direction, and an engagement projection to be engaged with the attachment engagement portion is provided in an inner side surface of the elastic portion.

A feature of a eighth aspect of the invention is configured such that, in addition to the configuration of one of the fifth aspect to the seventh aspect, the holder is provided separately from a support member main body, and the holder is fixed to the support member main body with a holder retainer.

A feature of a ninth aspect of the invention is configured such that, in addition to the configuration of one of the fifth aspect to the seventh aspect, the holder and a support member main body are formed into one unit.

As described above, the drive unit according to an aspect of the present invention includes the base member having the operation base having the one or more operation recesses in the front surface; the movable member that is disposed to be opposite to the base member and has the operation projection to be inserted into the operation recess in the opposed surface thereof; and the string or strip of shape memory alloy member that is disposed between the base member and the movable member and shrinks by heat generated by passing the electric current. In the drive unit, the movable member is moved in the direction away from the base member in conjunction with the shrinkage of the shape memory alloy member by the passage of the electric current, and the fixed portion is provided in the middle of the base member in the core axial direction of the shape memory alloy member in order to fix the middle on the support member. Therefore, it is possible to firmly fix the base member at the center of operation of the shape memory alloy member without using soldering, thus allowing a transmission of a driving force without any loss and a higher degree of flexibility in designing of the mounting structure to the support member such as the electronic equipment case.

In an aspect of the present invention, since the fixed portion is provided with the step-like attachment engagement portion that is disposed in the middle side surface of the base member in the core axial direction of the shape memory alloy member and projected in the direction intersecting the core axial direction of the shape memory alloy member, the fixed portion can be formed with ease and reliability.

Furthermore, in an aspect of the present invention, the base member includes the base member main body made of the insulating resin. The concave engagement recess that is open in the direction intersecting the core axial direction of the shape memory alloy member is provided in the middle side surface of the base member main body. The inner bottom edge of the engagement recess constitutes the attachment engagement portion. Therefore, the attachment engagement portion can be easily formed by molding.

Furthermore, the base member is provided with the bracket that is made of the conductive metal plate and has the side panels for covering the side surfaces of the base member. The engagement opening is formed through the side panel of the bracket. The inner bottom edge of the engagement opening constitutes the attachment engagement portion. Therefore, the attachment engagement portion can be easily formed by pressing.

The mounting structure of the drive unit according to an aspect of the present invention is the mounting structure of the drive unit for fixing the drive unit described in any one of the first aspect to fifth aspect on the support member. The support member includes the holder for containing the drive unit, the holder is provided with the fixing unit fixed to the fixed portion to each other, and the middle of the base member in the core axial direction of the shape memory alloy member is fixed to the support member. Therefore, it is possible to firmly fix the base member to the support member such as the electronic equipment case at the center of operation of the shape memory alloy member without using soldering, thus allowing a transmission of a driving force of the drive unit without any loss.

Also, in an aspect of the present invention, the holder includes the side wall opposite to the side surface of the drive unit, and the side wall supports the fixing unit to be engaged with the attachment engagement portion. Therefore, the drive unit can be fixed stably to the holder.

Furthermore, in an aspect of the present invention, the side wall is provided with the elastic portion that is supported at the end thereof in the core axial direction of the shape memory alloy member and elastically deformable in the wall thickness direction. The engagement projection to be engaged with the attachment engagement portion is provided in the inner side surface of the elastic portion. Therefore, it is possible to attach the drive unit to the holder with a single motion, and keep a state of fixing the middle of the base member in a stable manner.

Furthermore, in an aspect of the present invention, the holder is provided separately from the support member main body, and the holder is fixed to the support member main body with the holder retainer, so that the drive unit can be fixed to the desired support member.

Also in an aspect of the present invention, since the holder and the support member main body are formed into one unit, it is possible to integrate the drive unit directly into the electronic equipment case or the like.

DESCRIPTION OF EMBODIMENTS

Figure 1A:
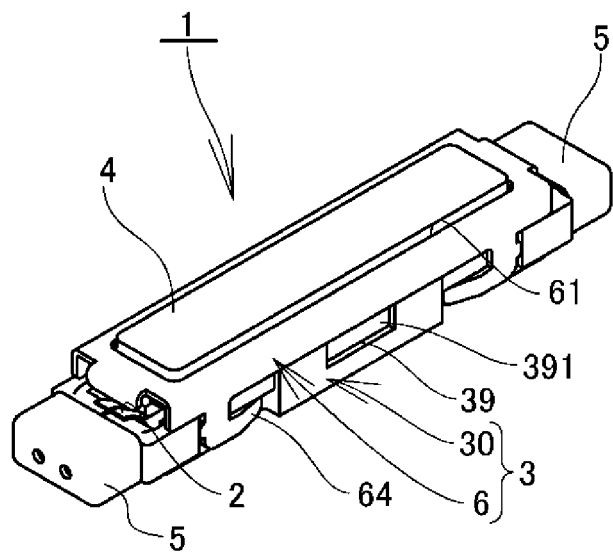
FIG. 1A is a perspective view illustrating an example of a drive unit according to the embodiment of the present invention.
Figure 1B:
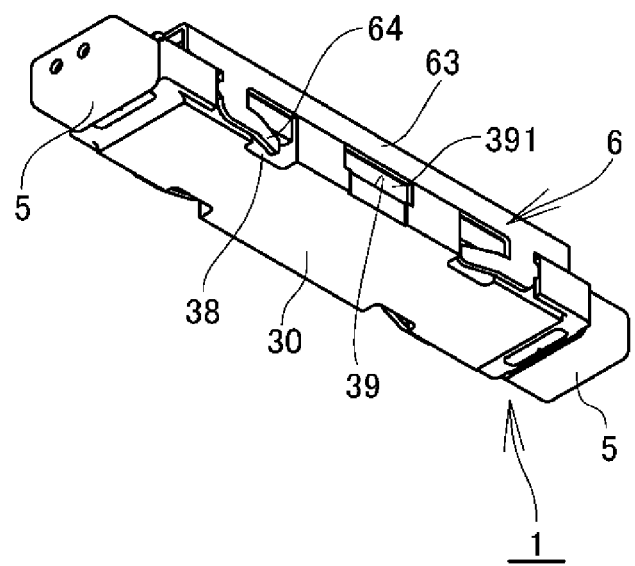
FIG. 1B is a perspective view illustrating an example of a drive unit according to the embodiment of the present invention.

An embodiment of the drive unit according to the present invention will now be described with reference to working examples illustrated in FIGS. 1A to 3. This working example takes the drive unit used as an actuator for generating vibration as an example.

A drive unit 1 is provided with a base member 3 having an operation base 32 made with one or more operation recesses 31, 31, . . . in a front surface, and a movable member 4 that is disposed to be opposite to the base member 3 and has operation projections 41, 41, . . . to be inserted into the operation recesses 31 in an opposed surface. A string or strip of shape memory alloy member 2, which shrinks by heat generated by passing an electric current therethrough, is disposed between the base member 3 and the movable member 4. In conjunction with the shrinkage of the shape memory alloy member 2 by the passage of the electric current, the movable member 4 is moved in a direction away from the base member 3.

The drive unit 1 is also provided with spring members 7, 7 supported by the base member 3. The spring members 7, 7 bias the movable member 4 in the direction away from the base member 3.

The drive unit 1 is also provided with terminal fittings 5, 5 that are fitted on respective ends of the base member 3 and fix ends of the shape memory alloy member 2 to the base member 3. The electric current passes through the shape memory alloy member 2 via the terminal fittings 5, 5.

The shape memory alloy member 2 includes a shape memory alloy wire 21 made of an alloy having a shape memory effect such as a nickel titanium alloy i.e. a shape memory alloy, and a strip-shaped sheath member 22 for covering the outside of the shape memory alloy wire 21. Even if the shape memory alloy wire 21 is deformed under a predetermined temperature, the shape memory alloy wire 21 shrinks by heat generated by passing an electric current through the shape memory alloy wire 21.

Figure 2:
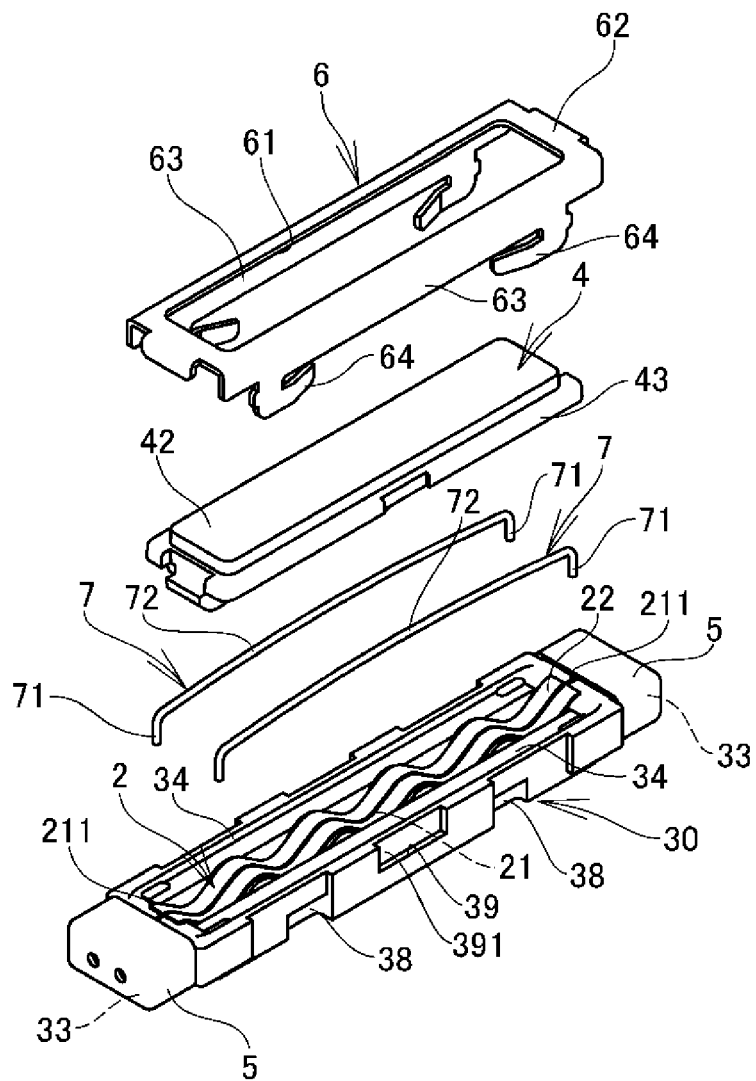
FIG. 2 is an exploded perspective view of the same.
Figure 3:
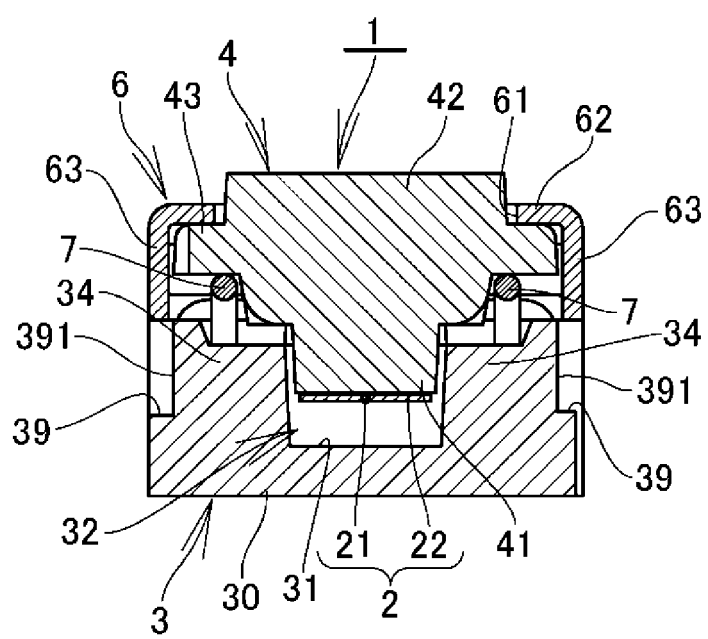
FIG. 3 is an enlarged cross-sectional view illustrating the part of an attachment engagement portion of the same.
Figure 4A:
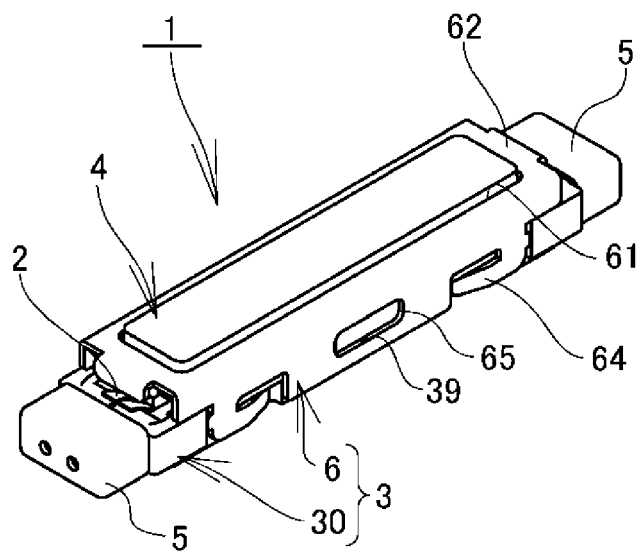
FIG. 4A is a perspective view illustrating another example of the drive unit according to the embodiment of the present invention.
Figure 4B:
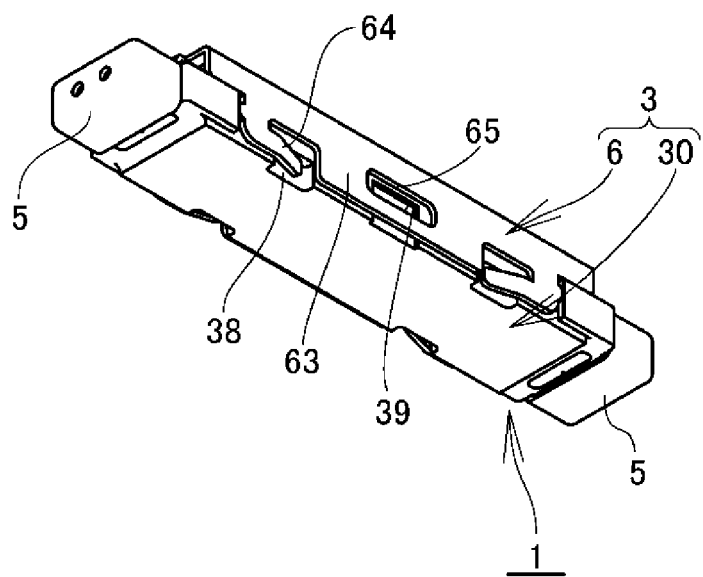
FIG. 4B is a perspective view illustrating another example of the drive unit according to the embodiment of the present invention.
Figure 5:
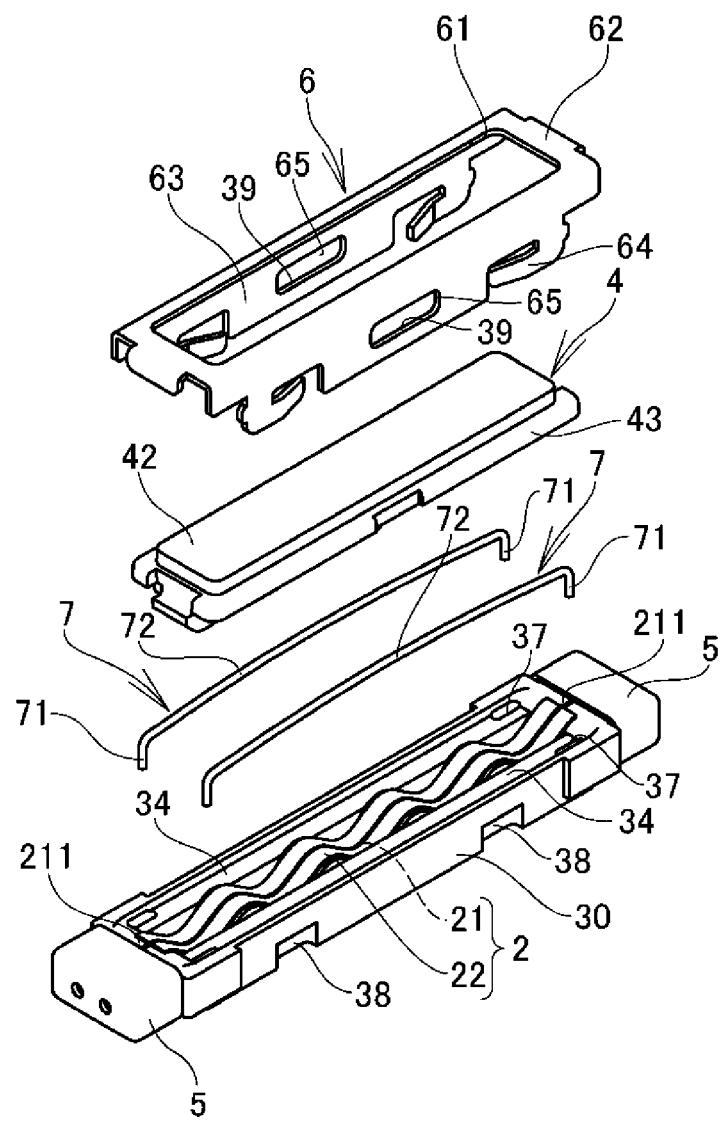
FIG. 5 is an exploded perspective view of the same.
Figure 6:
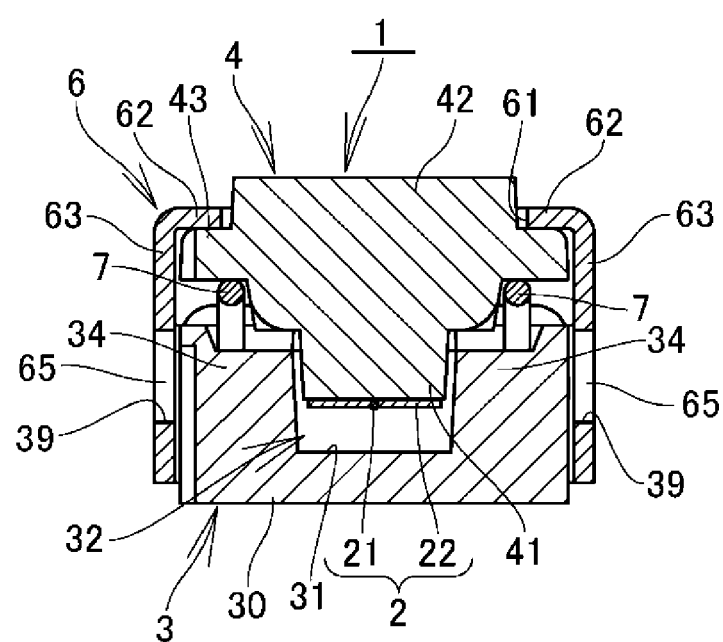
FIG. 6 is an enlarged cross-sectional view illustrating the part of an attachment engagement portion of the same.
Figure 7:
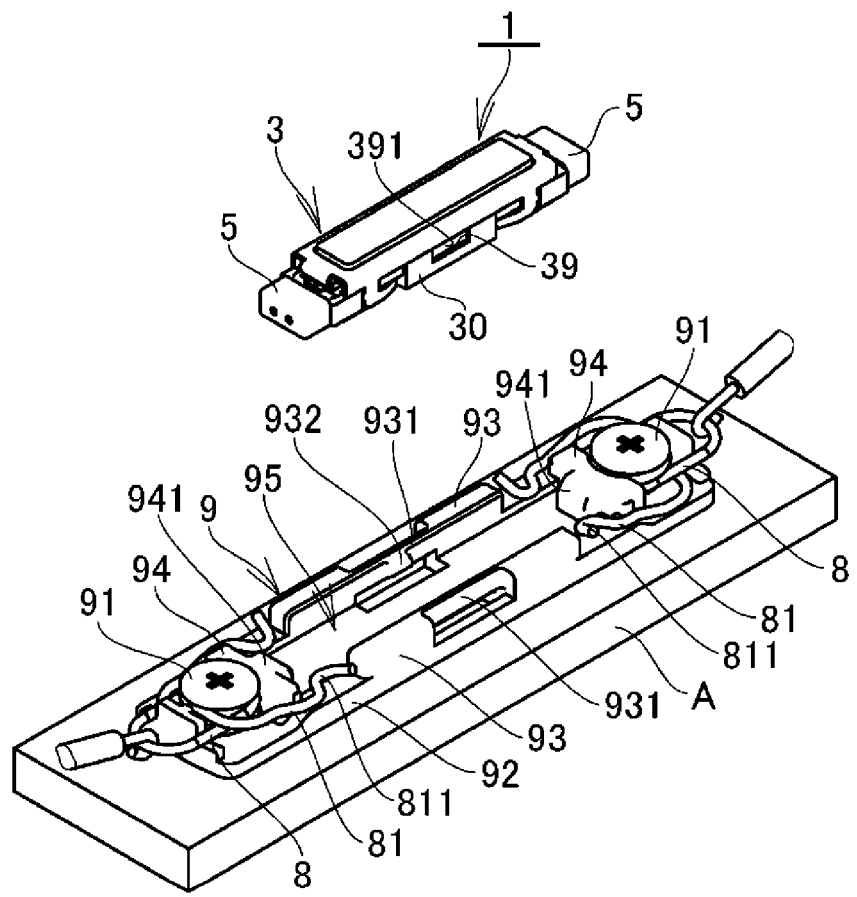
FIG. 7 is an exploded perspective view illustrating an example of a mounting structure of the drive unit according to the embodiment of the present invention.
Figure 8:
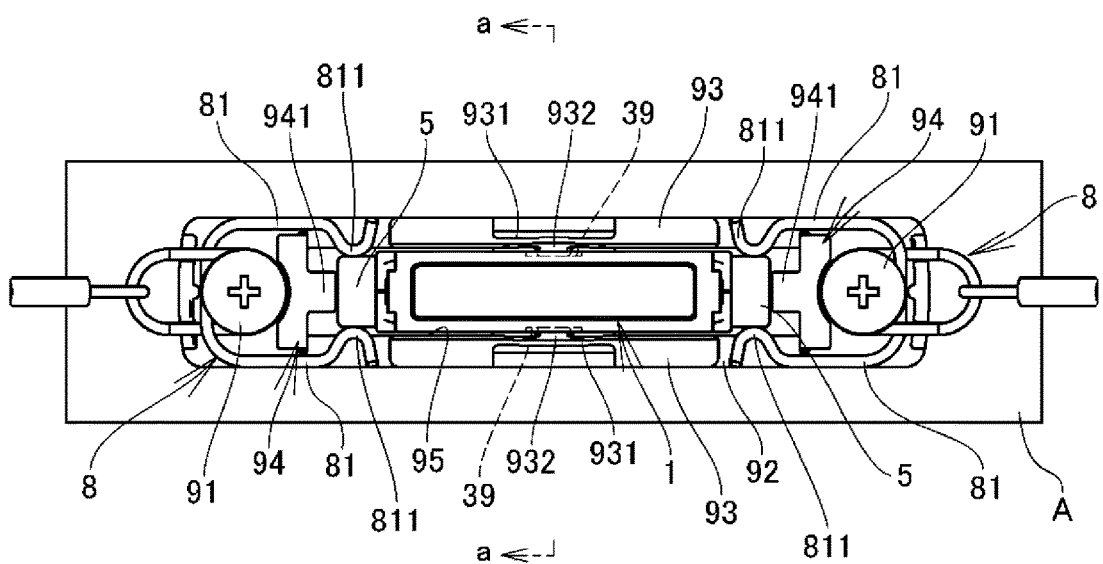
FIG. 8 is a plan view illustrating a state of mounting the same drive unit.
Figure 9:
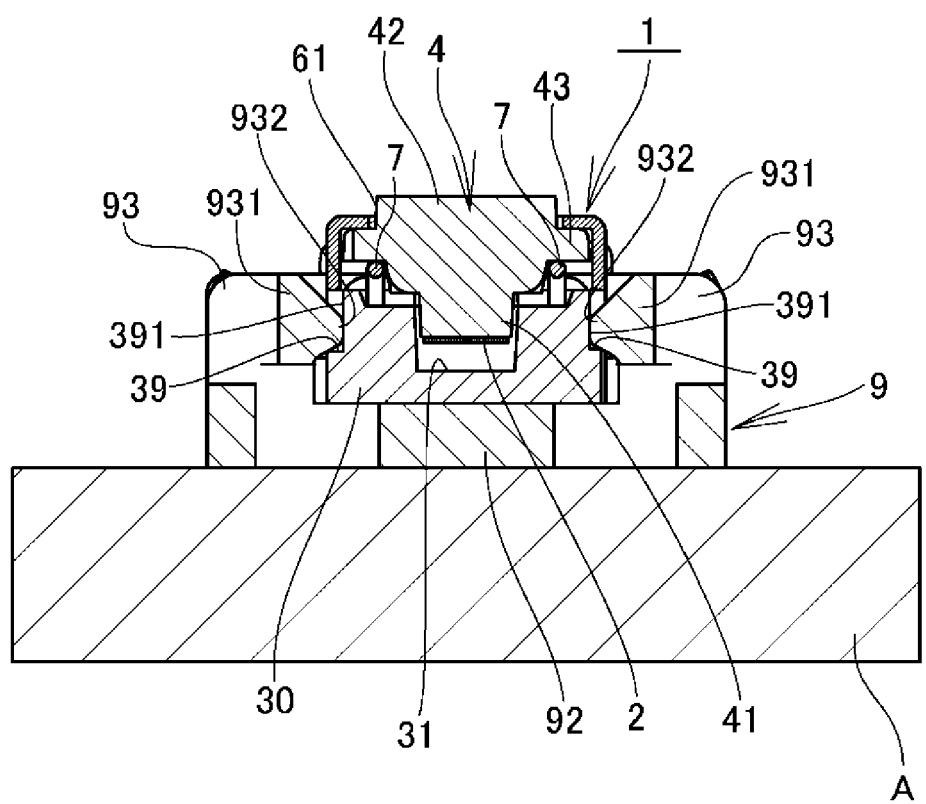
FIG. 9 is an enlarged cross-sectional view taken along line a-a in FIG. 8.

As illustrated in FIG. 2, the base member 3 is provided with a base member main body 30 formed from an insulating resin such as an insulating resin containing ceramic powder particles (hereinafter called ceramic resin), and a bracket 6 made of a conductive metal plate. By mounting the bracket 6 on the base member main body 30, the base member 3 holds the movable member 4.

The base member 3 is provided with a fixed portion in its middle in a core axial direction of the shape memory alloy member, to fix the middle of the base member on a support member such as a mounting board or an electronic equipment case.

The base member main body 30 is provided with the operation base 32 having the plurality of operation recesses 31, 31, . . . in the front surface, terminal retainers 33, 33 disposed at respective ends of the operation base 32, and rib-shaped spring holders 34, 34 erected on respective sides of the operation base 32.

In the operation base 32, a plurality of support projections 35, 35, . . . having a dome-shaped cross section are disposed continuously in a longitudinal direction of the base member in the shape of waves in cross section, and valleys of the waves constitute the operation recesses 31, 31, . . . . The shape memory alloy member 2 is put on every support projection 35, 35, . . . along its core axial direction throughout the operation base 32 between both of the terminal retainers 33, 33. Both the ends of the shape memory alloy member 2 are fixed to the terminal retainers 33, 33 by using the terminal fittings 5, 5, respectively.

The spring holders 34, 34 are formed in the shape of ribs having a certain width that are integrated with side surfaces of the operation base 32, so as to close side openings of the operation recesses 31, 31, . . . .

Guide holes 37, 37 are formed in the spring holders 34, 34 so as to be open on top surfaces thereof at both ends in a longitudinal direction. Spring bases 71, 71 of the spring members 7 are inserted into the guide holes 37, 37, so that the spring members 7 are supported by the spring holders.

The base member main body 30 is provided with step-like attachment engagement portions 39 in middle side surfaces thereof in the core axial direction of the shape memory alloy, that is, in middle outside surfaces of the spring holders 34, in such a manner that the attachment engagement portions 39 protrude in directions intersecting the core axial direction of the shape memory alloy member. The attachment engagement portions 39 constitute the fixed portion.

The attachment engagement portions 39 are made by providing concave engagement recesses 391 formed in the middle side surfaces of the base member main body 30, in such a manner that the engagement recesses 391 open in the directions intersecting the core axial direction of the shape memory alloy member. Inner bottom edges of the engagement recesses 391 constitute the attachment engagement portion 39.

As illustrated in FIG. 2, the engagement recesses 391 are formed in the shape of horizontally oriented rectangular recesses the outside and topside of which are opened.

The spring members 7 are each formed by bending an elastic metal wire. The spring members 7 each have pin-like spring bases 71, 71 to be inserted into the guide holes 37, and an arc-shaped spring body 72 protruding on the side of the movable member 4 while both ends thereof are supported between both of the spring bases 71, 71.

The guide holes 37, 37 of the spring holder 34 are each formed in the shape of a slot long in a longitudinal direction of the spring member 7, so that the spring bases 71 can move with being guided therein in conjunction with the elastic deformation of the spring body 72.

The terminal retainers 33, 33 are formed in the shape of a flat plate. Ends 211 of the shape memory alloy wire 21 are each folded from a top surface side of the terminal retainer 33 to a rear surface side through an end surface, and then the terminal fittings 5, 5 are fitted to from the outer sides to fix the ends 211 of the shape memory alloy wire 21.

The terminal fittings 5, 5 are each formed in the shape of a rectangular cylindrical cap one end of which is closed by squeezing a conductive metal material. By fitting the terminal fittings 5, 5 on the terminal retainers 33, 33, the ends of the shape memory alloy member 2 are fixed to the terminal retainers 33, 33 and connected to the terminal fittings 5, 5.

The rear surfaces of the terminal retainers 33, 33 are each formed with a swaging groove that extends in a direction intersecting the longitudinal direction of the base member 3. By swaging the rear surfaces of the terminal fittings 5, 5 in accordance with the positions of the swaging grooves, the ends of the shape memory alloy member 2 are reliably fixed to the terminal retainers 33, 33 and the terminal fittings 5, 5 are connected to the shape memory alloy member 2 in a stable manner.

The bracket 6 is formed into one unit by punching and bending a conductive metal plate. The bracket 6 includes a top panel 62 in the shape of a flat plate, and a pair of side panels 63, 63 that are bent downward from both side edges of the top panel 62.

The side panels 63, 63 are each formed in such a shape that covers only an upper portion of the side surface of the base member main body 30 in the core axial direction of the shape memory alloy member, so that the attachment engagement portion 39 formed in the side surface of the base member main body 30 in the core axial direction of the shape memory alloy member is exposed.

The side panels 63 are each integrally formed with engagement claws 64, 64 made by cutting and raising. The engagement claws 64, 64 are folded inward and engaged with engagement recesses 38 formed in the side surfaces of the base member 3, so that the bracket 6 is fixed to the base member 3 in an undetachable manner.

On the other hand, the movable member 4 is formed of an insulating resin such as an insulating resin containing ceramic powder particles (ceramic resin) into one unit, just as with the base member 3.

The movable member 4 is provided in its opposed surface with the plurality of dome-shaped operation projections 41, 41, . . . to be inserted into the operation recesses 31, 31, . . . of the base member 3. By overlaying the movable member 4 on the base member 3, the operation projections 41, 41, . . . are fitted into the respective operation recesses 31, 31, . . ., so that the shape memory alloy member 2 disposed between opposed surfaces of the movable member 4 and the base member 3 is deformed into the shape of waves in accordance with the shape of fitting surfaces of the operation projections 41, 41, . . ..

Since the side surfaces of the operation projections 41, 41, . . . are guided by the inner side surfaces of the spring holders 34, the movable member 4 is operated stably in a vertical direction with reducing variations in acceleration.

The movable member 4 is provided with a transmission portion 42 having a flat contact surface at a top end. The transmission portion 42 comes in and out of an insertion window 61 that is open on the top surface of the bracket 6.

Flange-like pushing portions 43 are provided integrally on the outer periphery of the movable member 4. The pushing portions 43 are retained by bringing it into contact with an outer frame of the insertion window 61 of the bracket 6, and bottom surfaces of the pushing portions 43 are pushed upward by the spring members 7, 7.

The aspect of the drive unit is not limited to the above-described working example, but may be that illustrated in FIGS. 4A to 6. Note that, components same as or similar to those in the above-described working example are denoted by the same reference numerals, and the description thereof will be omitted.

In this drive unit 1, just as with the above-described working example, the base member 3 is provided with the base member main body 30 made of an insulating resin, and the bracket 6 made by pressing a conductive metal plate.

The bracket 6 has the side panels 63, 63 that cover the side surfaces of the base member main body. In each side panel 63, formed is a rectangular engagement opening 65 penetrating the side panel 63, and the inner bottom edge of the engagement opening 65 constitutes the step-like attachment engagement portion 39.

In this case, the engagement openings 65 may constitute the attachment engagement portions 39 by themselves, or the engagement recesses 391 are provided in the base member main body 30 so as to be aligned with the engagement openings 65 and the engagement recesses 391 and the engagement openings 65 together with the engagement recesses 391 may constitute the attachment engagement portions 39.

Next, the mounting structure of the drive unit 1 will be described with reference to FIGS. 7 to 10B. It is noted that the reference numeral 1 denotes the drive unit, a reference sign A denotes a support member main body such as an electronic equipment case, and a reference sign B denotes a device to be driven such as the electronic equipment case.

In the mounting structure of the drive unit 1, the support member is provided with a holder 9 for containing the drive unit 1. The holder 9 is provided with a fixing unit that is fixed to the fixed portion of the drive unit 1 to each other, so that the middle of the base member 3 in the core axial direction of the shape memory alloy member is fixed to the support member main body A through the holder 9.

In the mounting structure of the drive unit 1, the support member separately has the holder 9. The holder 9 is fixed on the support member main body A such as the electronic equipment case with holder retainers 91, 91.

The holder 9 is provided with a board portion 92 made of an insulating resin in the shape of a flat plate, side walls 93, 93 integrally erected from side edges of the board portion 92, and terminal retainers 94, 94 disposed at both ends of the board portion 92 in a longitudinal direction. A container 95 is formed between both of the side walls 93, 93 to contain the drive unit 1. Each of the terminal retainers 94, 94 holds a clip-like connection terminal 8 that is in contact with the terminal fitting 5 of the drive unit 1.

The terminal retainers 94, 94 are disposed at respective ends of the container 95 in the longitudinal direction so as to double as part of the container 95. Convex contact projections 941 disposed in inner side surfaces of the terminal retainers 94, 94, respectively, are in contact with end surfaces of the drive unit 1 in the container 95, so as to restrain the movement in the longitudinal direction.

The side walls 93, 93 are formed lower relative to the entire height of the drive unit 1, to prevent interfere with the operation of the drive unit 1.

The side walls 93, 93 are each provided with an elastic portion 931 that is supported in its middle in the core axial direction of the shape memory alloy member and elastically deformable in a wall thickness direction. Engagement projections 932 are supported in the inner side surfaces of the elastic portions 931, to constitute the fixing unit, which is mutually fixed to the fixed portion, in the surfaces of the side walls 93, 93 opposite to the side surfaces of the drive unit 1.

The elastic portions 931 are formed in the middle of the side walls 93, 93 thinner than the other portions in such a manner that the bottom edges thereof are cut from the board portion 92. The elastic portions 931 are each configured to be supported at both ends in the core axial direction of the shape memory alloy member, thereby being elastically bendable in the wall thickness direction.

The engagement projections 932 are each formed in the shape of a ridge that has inclined surfaces at its top and bottom and protrudes inward. The engagement projection 932 is fitted into the engagement recess 391 of the drive unit 1, so that the inner bottom edge of the engagement recess 391, that is, the attachment engagement portion 39 and the bottom surface of the engagement projection 932 are engaged with each other.

The terminal retainers 94, 94 are erected on respective end portions of the top surface of the board portion 92 in an integral manner. By attaching the clip-like connection terminals 8 to the terminal retainers 94, 94, contact points 811 at tips of clip-like elastic contacts 81, 81 of the connection terminals 8 protrude into the container 95. When the drive unit 1 is fitted in the container 95, the contact points 811 come into contact with both side surfaces of the terminal fittings 5 of the drive unit 1, so that the respective elastic contacts 81, 81 catch the terminal fittings 5.

The holder retainers 91, 91 have such a structure as to be fixed by using fixation screws, for example, as shown in the working example, though it is not specifically limited. In this working example, the holder retainers 91, 91 double as retainers for fixing the connection terminals 8 to the terminal retainers 94, 94.

Figure 10A:
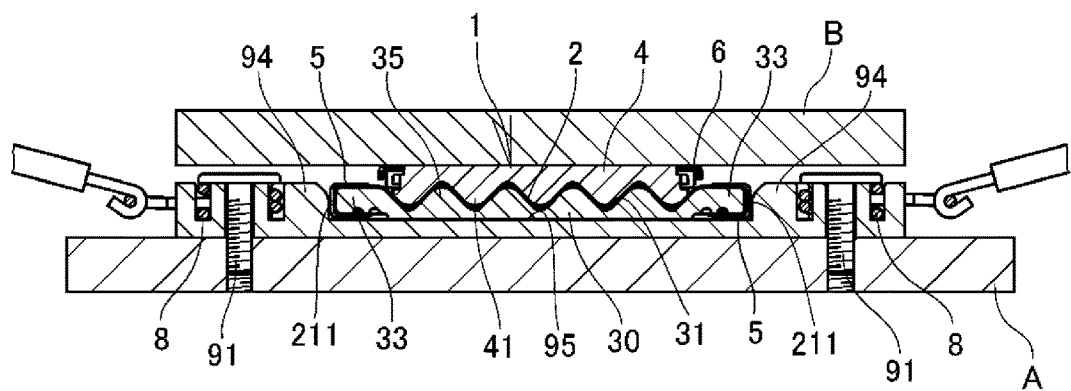
FIG. 10A is a cross-sectional view illustrating an operating state of the mounted drive unit in a non-energized state.
Figure 10B:
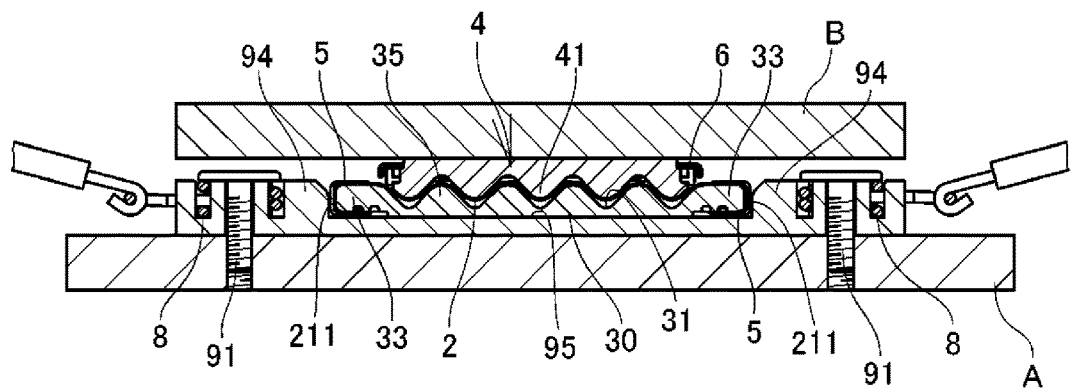
FIG. 10B is a cross-sectional view illustrating an operating state of the mounted drive unit in an energized state.

In the mounting structure of the drive unit 1 as described above, when the shape memory alloy member 2 shrinks from a state of FIG. 10A by passing an electric current therethrough, the movable member 4 is moved in the direction away from the base member 3 in conjunction with the shrinkage of the shape memory alloy member 2 and pushes up the device B to be driven as illustrated in FIG. 10B.

At this time, since the fixed portion is provided in the middle of the base member 3 of the drive unit 1 in the core axial direction of the shape memory alloy member and the fixing unit to be fixed to the fixed portion is provided in the holder 9, which constitutes the support member such as the electronic equipment case, the middle of the drive unit 1 in the core axial direction of the shape memory alloy member is firmly fixed to the support member main body A through the holder 9, and the base member 3 is stably supported by the support member main body A at the center of operation of the shape memory alloy member 2.

Therefore, it is possible to prevent the base member 3 from instantaneously floating from the support member (holder 9) in reaction to the operation of the drive unit 1, thus allowing a transmission of a driving force of the drive unit 1 to the device B to be driven without any loss.

The above-described working example has described the narrow rectangular parallelepiped drive unit 1. However, the aspect of the drive unit 1 is not limited to that described in the above-described working example, but may be an arc in plane or others.

The above-described drive unit 1 having the fixed portion is applicable to a working example other than the above-described one. By taking advantage of the fixed portion constituted by the attachment engagement portions 39, other mounting structures can be flexibly designed.

The fixing unit is not limited to the above-described working example. For example, the middle of a bottom surface of the base member 3 (base member main body) may constitute the fixed portion, and the middle of the base member 3 may be fixed to the support member with an adhesive or a double-side adhesive tape as the fixing unit. This may be used in combination with the fixed portion and the fixing unit of the above-described working example.

Furthermore, in the above-described working example, the fixing unit is constituted by the engagement projections that are supported by the side walls 93, 93 of the holder 9 and engaged with the attachment engagement portions 39 formed in the side surfaces of the base member 3, but the aspect of the fixing unit supported by the side walls 93, 93 is not limited to this. For example, screw members that penetrate the side walls 93, 93 in the wall thickness direction may be provided, and the screw members may be screwed in and engaged with the attachment engagement portions 39 of the drive unit 1.

Furthermore, in the above-described working example, the holder 9 is separate from the support member main body A, such as the electronic equipment case. However, the holder 9 may be formed integrally with the support main body such as the electronic equipment case, so as to be incorporated into the support member in advance.

The above-described working example describes the case of using the drive unit 1 as a vibration actuator, but the present invention is applicable to other types of drive units.

REFERENCE SIGNS LIST

A support member main body
B device to be driven
1 drive unit
2 shape memory alloy member
21 shape memory alloy wire
22 sheath member
3 base member
30 base member main body
31 operation recess
32 operation base
33 terminal retainer
34 spring holder
35 support projection
37 guide hole
38 engagement recess
39 attachment engagement portion
391 engagement recess
4 movable member
41 operation projection
42 transmission portion
43 flange portion
5 terminal fitting
6 bracket
61 insertion window
62 top panel
63 side panel 64 engagement claw
65 engagement opening
7 spring member
71 spring base
72 spring body
8 connection terminal
81 elastic contact
811 contact point
9 holder
91 holder retainer
92 board portion
93 side wall
931 elastic portion
932 engagement projection
94 terminal retainer
941 convex contact projection
95 container

The invention claimed is:

1. A drive unit comprising:
a base member having an operation base having one or more operation recesses in a front surface thereof;
a movable member that is disposed to be opposite to the base member and has an operation projection to be inserted into the operation recess in an opposed surface thereof; and
a string or strip of shape memory alloy member that is disposed between the base member and the movable member and shrinks by heat generated by passing an electric current, wherein
the drive unit is configured such that the movable member is moved in a direction away from the base member in conjunction with the shrinkage of the shape memory alloy member by the passage of the electric current,
a fixed portion is provided in a middle of the base member in a core axial direction of the shape memory alloy member in order to fix the middle on a support member and is provided with a step-like attachment engagement portion that is disposed in a middle side surface of the base member in the core axial direction of the shape memory alloy member and projected in a direction intersecting the core axial direction of the shape memory alloy member, wherein
the base member includes a base member main body made of an insulating resin,
a concave engagement recess that is open in the direction intersecting the core axial direction of the shape memory alloy member is provided in a middle side surface of the base member main body, and
an inner bottom edge of the engagement recess constitutes the attachment engagement portion.

2. A mounting structure of a drive unit for fixing the drive unit according to claim 1 on the support member, wherein
the support member includes a holder for containing the drive unit,
the holder is provided with a fixing unit fixed to the fixed portion to each other, and
the middle of the base member in the core axial direction of the shape memory alloy member is fixed to the support member.

3. The mounting structure of a drive unit according to claim 2, wherein
the holder includes a side wall opposite to a side surface of the drive unit, and
the side wall supports the fixing unit to be engaged with the attachment engagement portion.

4. The mounting structure of a drive unit according to claim 3, wherein
the side wall is provided with an elastic portion that is supported at an end thereof in the core axial direction of the shape memory alloy member and elastically deformable in a wall thickness direction, and
an engagement projection to be engaged with the attachment engagement portion is provided in an inner side surface of the elastic portion.

5. The mounting structure of a drive unit according to claim 2, wherein
the holder is provided separately from a support member main body, and
the holder is fixed to the support member main body with a holder retainer.

6. The mounting structure of a drive unit according to claim 2, wherein the holder and a support member main body are formed into one unit.

7. A drive unit comprising:
a base member having an operation base having one or more operation recesses in a front surface thereof;
a movable member that is disposed to be opposite to the base member and has an operation projection to be inserted into the operation recess in an opposed surface thereof; and
a string or strip of shape memory alloy member that is disposed between the base member and the movable member and shrinks by heat generated by passing an electric current, wherein
the drive unit is configured such that the movable member is moved in a direction away from the base member in conjunction with the shrinkage of the shape memory alloy member by the passage of the electric current,
a fixed portion is provided in a middle of the base member in a core axial direction of the shape memory alloy member in order to fix the middle on a support member and is provided with a step-like attachment engagement portion that is disposed in a middle side surface of the base member in the core axial direction of the shape memory alloy member and projected in a direction intersecting the core axial direction of the shape memory alloy member, wherein
the base member is provided with a bracket that is made of a conductive metal plate and has side panels for covering side surfaces of the base member,
an engagement opening is formed through the side panel of the bracket, and
an inner bottom edge of the engagement opening constitutes the attachment engagement portion.

8. A mounting structure of a drive unit for fixing the drive unit according to claim 7 on the support member, wherein
the support member includes a holder for containing the drive unit,
the holder is provided with a fixing unit fixed to the fixed portion to each other, and
the middle of the base member in the core axial direction of the shape memory alloy member is fixed to the support member.

9. The mounting structure of a drive unit according to claim 8, wherein
the holder includes a side wall opposite to a side surface of the drive unit, and
the side wall supports the fixing unit to be engaged with the attachment engagement portion.

10. The mounting structure of a drive unit according to claim 9, wherein
the side wall is provided with an elastic portion that is supported at an end thereof in the core axial direction of the shape memory alloy member and elastically deformable in a wall thickness direction, and an engagement projection to be engaged with the attachment engagement portion is provided in an inner side surface of the elastic portion.

11. The mounting structure of a drive unit according to claim 8, wherein the holder is provided separately from a support member main body, and the holder is fixed to the support member main body with a holder retainer.

12. The mounting structure of a drive unit according to claim 8, wherein the holder and a support member main body are formed into one unit.

* * * * *